United States Patent
Tokiwa

(10) Patent No.: US 7,546,788 B2
(45) Date of Patent: Jun. 16, 2009

(54) METHOD OF CUTTING OFF WORKPIECE USING BAND SAW MACHINE AS WELL AS BAND SAW MACHINE

(75) Inventor: Toru Tokiwa, Kanagawa (JP)

(73) Assignee: Amada Company, Limited, Kanagawa (JP)

(*) Notice: Subject to any disclaimer, the term of this patent is extended or adjusted under 35 U.S.C. 154(b) by 0 days.

(21) Appl. No.: 12/208,260

(22) Filed: Sep. 10, 2008

(65) Prior Publication Data

US 2009/0007437 A1 Jan. 8, 2009

Related U.S. Application Data

(63) Continuation of application No. 11/915,266, filed as application No. PCT/JP2006/310265 on May 23, 2006.

(30) Foreign Application Priority Data

| May 23, 2005 | (JP) | ............................. 2005-150053 |
| Jan. 12, 2006 | (JP) | ............................. 2006-005128 |
| Feb. 27, 2006 | (JP) | ............................. 2006-050617 |
| Feb. 27, 2006 | (JP) | ............................. 2006-050704 |

(51) Int. Cl.
*B23D 55/00* (2006.01)

(52) U.S. Cl. .................. 83/13; 83/72; 83/788

(58) Field of Classification Search ............ 83/72, 83/74, 789, 788

See application file for complete search history.

(56) References Cited

U.S. PATENT DOCUMENTS

2003/0167894 A1 * 9/2003 Missler .................. 83/816
2006/0144202 A1   7/2006 Tokiwa et al.

FOREIGN PATENT DOCUMENTS

| JP | 57-107730 | 7/1982 |
| JP | 8-197330 | 8/1996 |
| JP | 2004-284006 | * 10/2004 |
| JP | 2005-81450 | 3/2005 |

OTHER PUBLICATIONS

English Language Abstract of JP 2004-284006.
English Language Abstract of JP 8-197330.
English Language Abstract of JP 57-107730.
English Language Abstract of JP 2005-81450.

* cited by examiner

*Primary Examiner*—Kenneth E Peterson
(74) *Attorney, Agent, or Firm*—Greenblum & Bernstein, P.L.C.

(57) ABSTRACT

A method of cutting a workpiece using an endless band saw blade and a band saw machine are provided. The method includes suspending the endless band saw blade between a driving wheel and a driven wheel such that the workpiece may be cut by the endless band saw blade, applying at least a first pulse and a second pulse to a first motor rotating the driving wheel and a second motor rotating the driven wheel, respectively, wherein the pulses have phases opposite to each other, and cutting the workpiece. The band saw machine includes a driving wheel having a first motor and a driven wheel having a second motor. The band saw machine further includes a pulse applying module that applies at least a first pulse and a second pulse to the first motor and the second motor, respectively, wherein the pulses have phases opposite to each.

2 Claims, 11 Drawing Sheets

FIG. 4
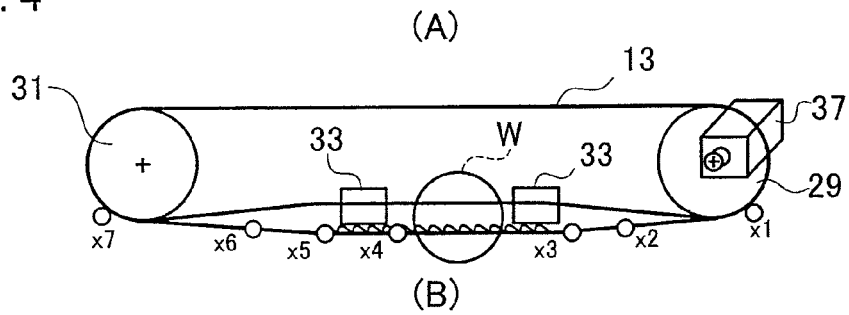
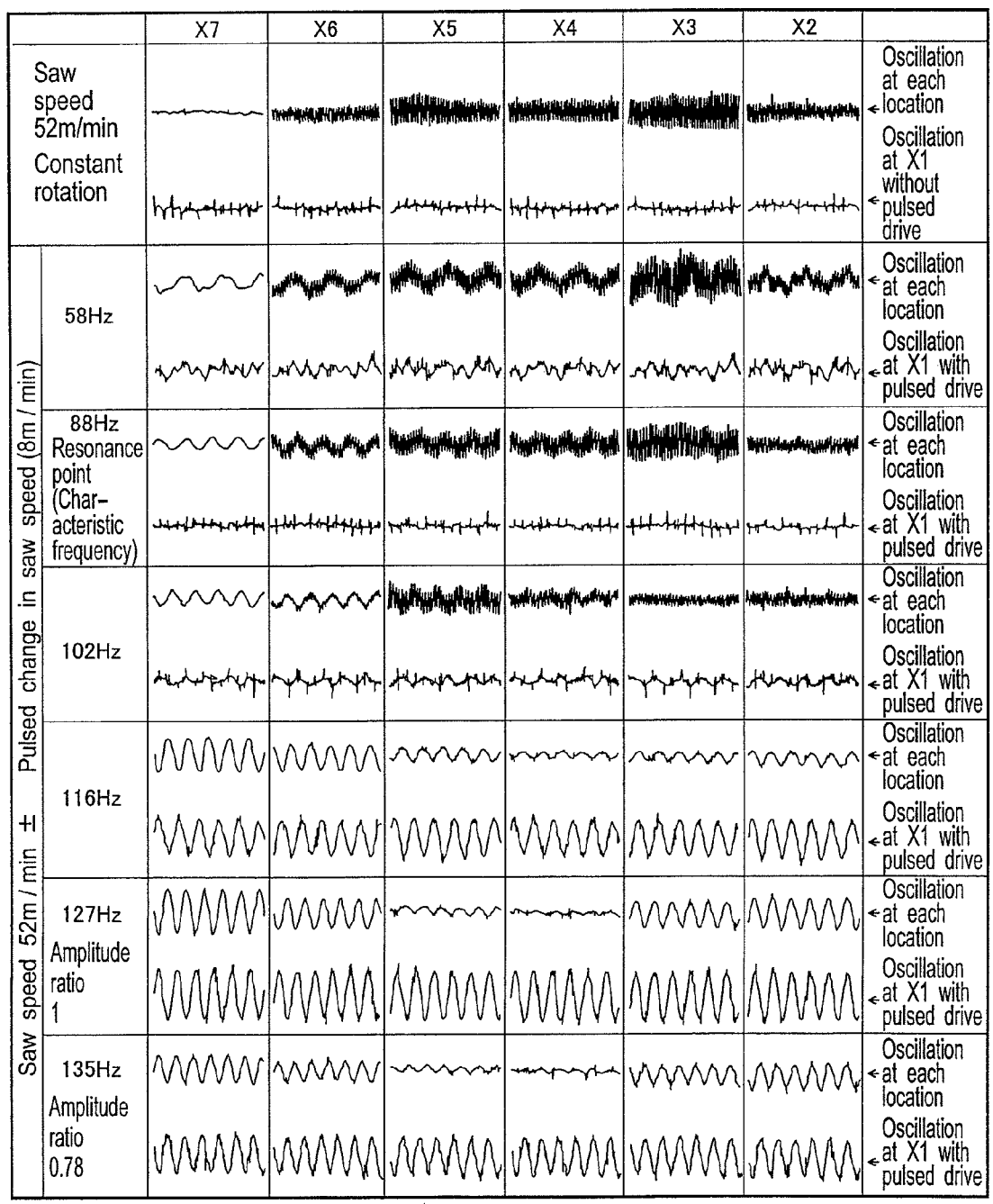

FIG. 6
(A)
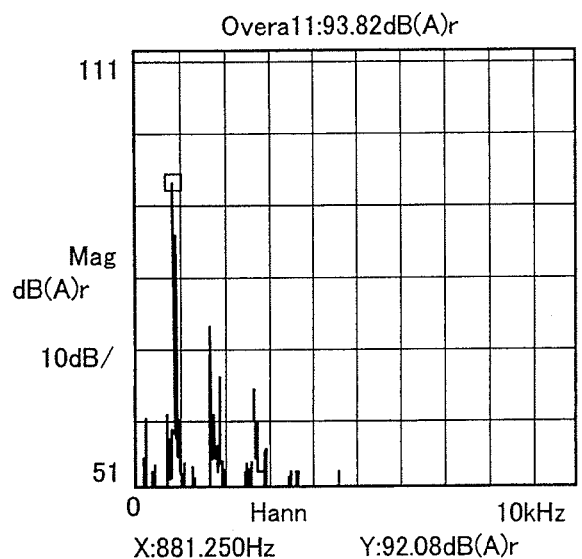
( WHILE PULSES WITH A FREQUENCY OF 102Hz ARE APPLIED )
(B)
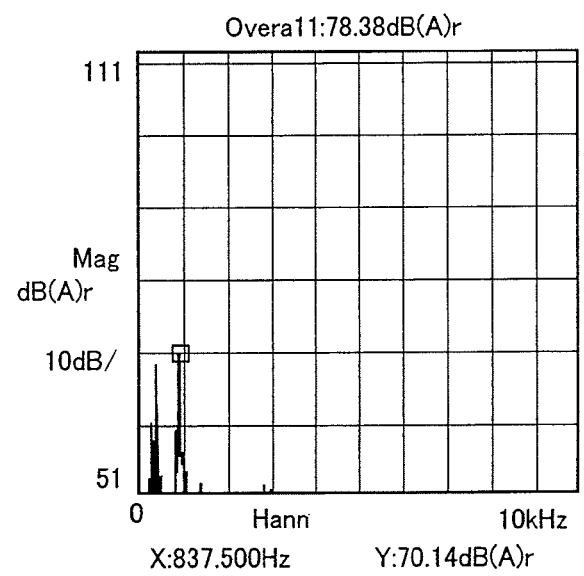
( WHILE PULSES WITH A FREQUENCY OF 116Hz ARE APPLIED )

FIG. 7
(A)
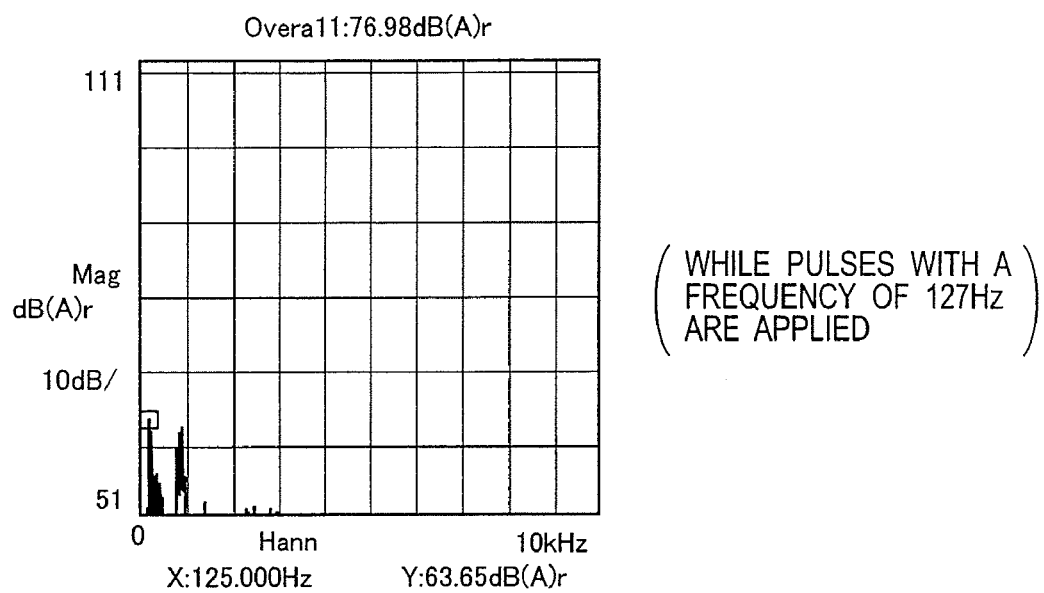
(WHILE PULSES WITH A FREQUENCY OF 127Hz ARE APPLIED)
(B)
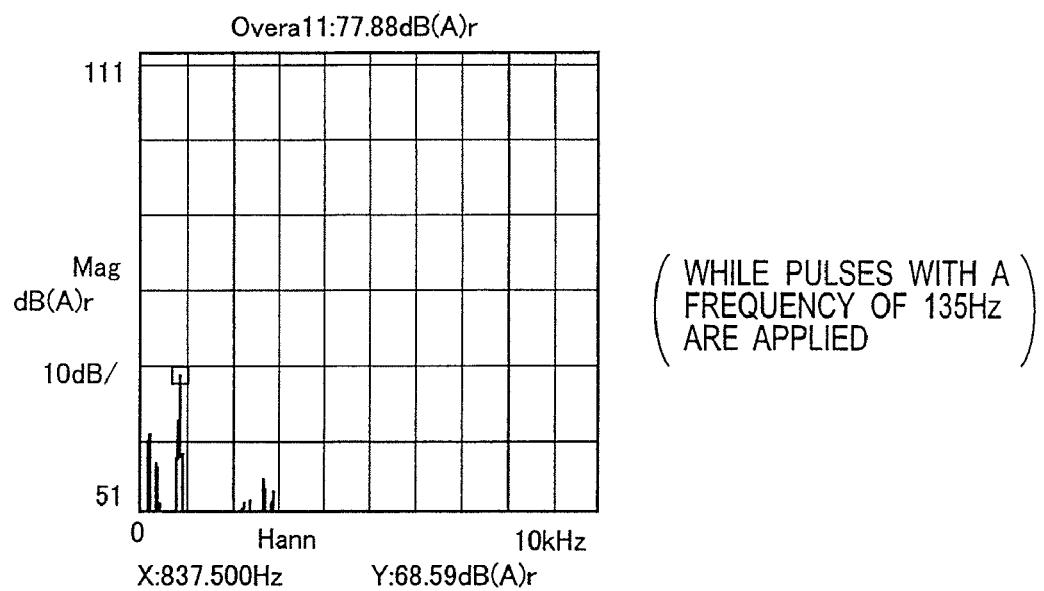
(WHILE PULSES WITH A FREQUENCY OF 135Hz ARE APPLIED)

METHOD OF CUTTING OFF WORKPIECE USING BAND SAW MACHINE AS WELL AS BAND SAW MACHINE

CROSS-REFERENCE TO RELATED APPLICATION

The present application is a continuation application based on pending U.S. patent application Ser. No. 11/915,266 filed on Nov. 21, 2007 (national stage application of PCT/JP2006/310265, filed May 23, 2006), which claims priority based upon Japanese Application Nos. JP2005-150053, filed May 25, 2005, JP2006-005128, filed Jan. 12, 2006, JP2006-050617, filed Feb. 27, 2006, and JP2006-050704, filed Feb. 27, 2006, the contents of which are expressly incorporated by reference herein in their entirety.

TECHNICAL FIELD

The present invention relates to a method of cutting off a workpiece using a band saw machine including a band saw blade, and to a band saw machine used for the cutting-off method. More specifically, the present invention relates to a method of cutting off a workpiece while restraining a band saw blade from chattering, and to the band saw machine used for the cutting-off method.

BACKGROUND ART

Band saw machines include vertical band saw machines and horizontal band saw machines. In order to facilitate understanding, schematic descriptions will be provided for an overall configuration of a horizontal band saw machine as an example of the band saw machines. As conceptually and schematically shown in FIG. 1, a horizontal band saw machine 1 includes a base 3. A vise device 5 to which a workpiece W to be cut off can be fixed is mounted on this base 3. The vise device 5 has a configuration including: a fixed vise jaw 9A which is fixed to a vise head 7 for supporting the workpiece W; and a movable vise jaw 9b. The fixed vise jaw 9A and the movable vise jaw 9b are set opposite to each other. The vise device 5 includes a hydraulic cylinder 11 for operating the movable vise jaw 9B. A saw blade housing 15 including a band saw blade 13 for cutting off the workpiece W is movably provided above the base 3. The saw blade housing 15 thus provided is capable of moving in such directions as to make the saw blade housing 15 relatively move close to/away from the workpiece W. In other words, the saw blade housing 15 moves in upward and downward directions in the illustrated example.

In other words, in this example, a lifting member 19 included in the saw blade housing 15 in an integrated manner is guided by a guide post 17 mounted upright on the base 3 in a way that the lifting member 19 is movable upward and downward. In addition, a lifting hydraulic cylinder 21 as an example of a cutting actuator is provided in such directions as to make the saw blade housing 15 relatively move close to/away from the workpiece W. In other words, the saw blade housing 15 moves in upward and downward directions in the illustrated example. Furthermore, for the purpose of detecting a position indicating where the band saw blade 13 cuts into the workpiece W, the horizontal band saw machine 1 is provided with a cutting position detector 23 for detecting the position indicating where the band saw blade 13 cuts into the workpiece W through detecting a position indicating how far upward and downward the saw blade housing 15 moves.

The cutting position detector 23 may have a configuration including a vertical linear scale provided on the guide post 17 and a detection head, for example, or may have a configuration in which a rotary encoder is rotated by a pinion engaged with a rack. In a mode in which the saw blade housing 15 swings vertically, the rotary encoder may be provided on a hinge in the saw blade housing. Thus, various configurations can be used.

The saw blade housing 15 has a configuration that includes wheel housings 27A and 27B on the left and right sides of a beam member 25 long in the left-and-right direction in the drawing. The saw blade housing 15 has a configuration in which a driving wheel 29 is rotatably provided in one of the wheel housings, 27A, whereas a driven wheel 31 is rotatably provided in the other wheel housing 27B. In addition, the saw blade housing 15 has a configuration in which the band saw blade 13 is suspended between the driving wheel 29 and the driven wheel 31. Band saw blade guides 33 for guiding and holding the band saw blade 13 with the cutting edge of the band saw blade 13 being directed to the workpiece W are provided between both the wheel housings 27A and 27B.

The horizontal band saw machine 1 of the foregoing type is publicly known. For this reason, the descriptions for how the above-described configurations operate the band saw machine are omitted.

With the above-described configurations, a motor 37 installed in the wheel housing 27A is rotationally driven, the driving wheel 29 is thus rotated, and the saw blade housing 15 is caused to descend with the band saw blade 13 being rotationally running, under control of a controller 35 such as a CNC. Thereby, the workpiece W is cut off by the band saw blade 13.

The band saw blade 13 has a configuration which has a large number of saw teeth, arranged in intervals that vary depending on the necessity, on one side of the band saw blade 13 in the width direction. The saw teeth cut into the workpiece W, and thus the cutting-off processing of the workpiece is accomplished. In this respect, cutting resistance working on each saw tooth is not equal, for example, depending on its abrasion. Variation in cutting resistances is highly likely to cause the band saw blade 13 to oscillate (longitudinal or compressional oscillation) in a direction in which the band saw blade 13 runs (in a direction in which a main component force is produced) (hereinafter referred to as a "main-component-force direction"). In some cases, this oscillation develops into a chatter oscillation accompanying abnormal noises.

For the purpose of restraining noises which occur due to the chatter oscillation, various countermeasures have been heretofore adopted. Such countermeasures include: increasing mechanical rigidity; interposing the band saw blade between oscillation isolating rollers; and covering the band saw blade so as to prevent noises from leaking. Nevertheless, configurations of a conventional type impose limitation on the restraining of the chatter oscillation which occurs due to the longitudinal oscillation.

As a reference, Japanese Patent Application, Laid-Open No. 2004-284006 (Patent Document 1) is a preceding example which has some bearings on the present invention.

In the case of a configuration as recited in Patent Document 1, when the workpiece is cut off, pulses are applied to a control motor for rotationally driving the band saw blade, and thus the running speed of the band saw blade is oscillated. The cutting off of the workpiece by oscillating the running speed of the band saw blade is equivalent to vibration cutting using the band saw blade. A workpiece is cut off better by the cutting-off method with this configuration than by a cutting-off method of the conventional type using a regular band saw machine, and concurrently noises are restrained (checked) from occurring.

In other words, the effect of restraining noises from occurring while the workpiece is being cut off is enhanced to some extent. Nevertheless, it is still expected that a chatter oscillation which occurs to the band saw blade due to its longitudinal oscillation (its oscillation occurring in the main-component-force direction) will be effectively restrained (checked).

The present invention has been made for the purpose of solving the foregoing problem. An object of the present invention is to provide a method of cutting off a workpiece, which method is capable of restraining (checking) of a band saw blade from chattering, and a band saw machine used for the cutting-off method.

DISCLOSURE OF THE INVENTION

For the purpose of achieving the foregoing object, in a case of a method of cutting off a workpiece using a band saw blade according to a first aspect of the present invention, when a workpiece is intended to be cut off by use of an endless band saw blade suspended between a driving wheel and a driven wheel, the workpiece is cut off by imparting to the band saw blade a forced oscillation so that the phase of the longitudinal oscillation which occurs to the band saw blade near the driving wheel is substantially inverted to the phase of the longitudinal oscillation which occurs to the band saw blade near the driven wheel.

A method of cutting off a workpiece using a band saw blade according to a second aspect of the present invention, which is dependent on the first aspect, has the foregoing configuration, in which pulses with a frequency not less than the characteristic frequency of a band saw blade supporting system are applied to a motor for driving the driving wheel so that the phase of the longitudinal oscillation which occurs to the band saw blade near the driving wheel is substantially inverted to the phase of the longitudinal oscillation which occurs to the band saw blade near the driven wheel.

A method of cutting off a workpiece using a band saw blade according to a third aspect of the present invention, which is dependent on the first aspect, has the foregoing configuration, in which a chatter oscillation of the band saw blade is detected while the workpiece is being cut off, and an oscillation having a phase obtained by inverting the phase of the chatter oscillation thus detected is imparted to the band saw blade.

A band saw machine according to a fourth aspect of the present invention is that which includes an endless band saw blade suspended between a driving wheel and a driven wheel, the band saw machine including: a motor for rotationally driving the driving wheel; and pulse applying means which applies pulses to a motor for rotating the driven wheel or braking means for braking the driven wheel.

A band saw machine according to a fifth aspect of the present invention is that which includes an endless band saw blade suspended between a driving wheel and a driven wheel, the band saw machine including: chatter oscillation detecting means which detects a chatter oscillation of the band saw blade; and pulse imparting means which forcefully imparts to the band saw blade an oscillation having a phase obtained by inverting the phase of the chatter oscillation detected by the chatter oscillation detecting means.

A band saw machine according to a 6th aspect of the present invention is that which includes an endless band saw blade suspended between a driving wheel and a driven wheel, the band saw machine including controlling means which intermittently accelerates or decelerates the driving wheel, the driven wheel or the band saw blade itself momentarily.

Any one of the first to 6th aspects of the present invention makes it possible to restrain (check) the chatter oscillation, because the arrangement is made so that the phase of the longitudinal oscillation which occurs to the band saw blade near the driving wheel is substantially inverted to the phase of the longitudinal oscillation which occurs to the band saw blade near the driven wheel whereby an effect of the oscillations offsetting each other occurs in a vicinity of an area where the workpiece is cut with the band saw blade.

In a case of a method of cutting off a workpiece using a band saw blade according to a 7th aspect of the present invention, when a workpiece is intended to be cut off by use of an endless band saw blade suspended between a driving wheel and as driven wheel, the workpiece is cut off by imparting to the band saw blade a forced oscillation so that the phase of the oscillation which occurs to the band saw blade in a main-component-force direction near the driving wheel is substantially inverted to the phase of the oscillation which occurs to the band saw blade in the main-component-force direction near the driven wheel.

A method of cutting off a workpiece using a band saw blade according to an 8th aspect of the present invention, which is dependent on the 7th aspect, has the foregoing configuration, in which pulses with a frequency not less than the characteristic frequency of a band saw blade supporting system are applied to a motor for driving the driving wheel so that the phase of the oscillation which occurs to the band saw blade in the main-component-force direction near the driving wheel is substantially inverted to the phase of the oscillation which occurs to the band saw blade in the main-component-force direction near the driven wheel.

A band saw machine according to a 9th aspect of the present invention is that which cuts off a workpiece by use of an endless band saw blade suspended between a driving wheel and a driven wheel, the band saw machine including means which imparts to the band saw blade a forced oscillation so that the phase of the oscillation which occurs to the band saw blade in a main-component-force direction near the driving wheel is substantially inverted to the phase of the oscillation which occurs to the band saw blade in the main-component-force direction near the driven wheel.

Any one of the 7th to 9th aspects makes it possible to effectively restrain (check) the chatter oscillation, because the arrangement is made so that the phase of the oscillation which occurs to the band saw blade in the main-component-force direction near the driving wheel is substantially inverted to the phase of the oscillation which occurs to the band saw blade in the main-component-force direction near the driven wheel whereby an effect of the oscillations offsetting each other occurs in a vicinity of an area where the workpiece is cut with the band saw blade.

In a case of a method of cutting off a workpiece using a band saw blade according to a 10th aspect of the present invention, when a workpiece is intended to be cut off by use of an endless band saw blade suspended between a driving wheel and a driven wheel, the workpiece is cut off by imparting to the driving wheel or the driven wheel a forced longitudinal oscillation so that the phase of the oscillation of the driving wheel in its rotational direction is substantially inverted to the phase of the oscillation of the driven wheel in its rotational direction.

A method of cutting off a workpiece using a band saw blade according to an 11th aspect of the present invention, which is dependent on the 10th aspect, has the foregoing configuration, in which pulses with a frequency of 116 Hz to 135 HZ, preferably with a frequency of 127 Hz, are applied to a driving motor for rotationally driving the driving wheel for the purpose of causing the driving wheel to oscillate in its rotational direction.

A method of cutting off a workpiece using a band saw blade according to an 12th aspect of the present invention, which is dependent on the 10th aspect, has the foregoing configuration, which is made to oscillate the band saw blade in a main-component-force direction by causing the driving wheel or the driven wheel to forcedly oscillate in its rotational direction so that the ratio between the amplitude of the oscillation which occurs to the band saw blade near the driving wheel and the amplitude of the oscillation which occurs to the band saw blade near the driven wheel is equal to approximately one.

In a case of a method of cutting off a workpiece using a band saw blade according to a 13th aspect of the present invention, when a workpiece is intended to be cut off by use of an endless band saw blade suspended between a driving wheel and a driven wheel, a node of oscillation in a main-component-force direction is formed between the driving wheel and the driven wheel by imparting to the band saw blade a forced longitudinal oscillation so that the phase of the oscillation which occurs to the band saw blade in the main-component-force direction near the driving wheel is substantially inverted to the phase of the oscillation which occurs to the band saw blade in the main-component-force direction near the driven wheel, and thus a frictional chatter oscillation is blocked in a section where the node is formed, whereby the frictional chatter oscillation is restrained (checked) while the workpiece is being cut off.

In a case of a method of cutting off a workpiece using a band saw blade according to a 14th aspect of the present invention, when a workpiece is intended to be cut off by use of an endless band saw blade suspended between a driving wheel and a driven wheel, the workpiece is cut off by generating a node in a vertical direction of the forced longitudinal oscillation, which node is imparted to the band saw blade, in a substantially central section of a width with which the workpiece is cut off.

A band saw machine according to a 15th aspect of the present invention is that which includes an endless band saw blade suspended between a driving wheel and a driven wheel, the band saw machine including: a motor which rotates the driving wheel; and forced oscillation imparting means which imparts to the driving wheel an oscillation so that the phase of the oscillation of the driving wheel in its rotational direction is substantially inverted to the phase of the oscillation of the driven wheel in its rotational direction.

Any one of the 10th to 15th aspects of the present invention makes it possible to effectively restrain the chatter oscillation, because the arrangement is made so that the phase of the oscillation which occurs to the band saw blade in the main-component-force direction near the driving wheel is substantially inverted to the phase of the oscillation which occurs to the band saw blade in the main-component-force direction near the driven wheel whereby the node for causing the oscillations to offset each other occurs in a vicinity of an area where the workpiece is cut with the band saw blade.

In a case of a method of cutting off a workpiece using a band saw blade according to a 16th aspect of the present invention, when a workpiece is intended to be cut off by use of an endless band saw blade suspended between a driving wheel and a driven wheel, a node of a longitudinal oscillation of the band saw blade is formed between the driving wheel and the driven wheel by imparting to the band saw blade a forced longitudinal oscillation so that the phase of the longitudinal oscillation which occurs to the band saw blade near the driving wheel is substantially inverted to the phase of the longitudinal oscillation which occurs to the band saw blade near the driven wheel, and thus a frictional chatter oscillation is blocked in a section where the node is formed, whereby the frictional chatter oscillation is restrained (checked) while the workpiece is being cut off.

A method of cutting off a workpiece using a band saw blade according to a 17th aspect of the present invention, which is dependent on the 16th aspect, has the foregoing configuration, in which the workpiece is cut off by generating the node in a longitudinal direction of the forced longitudinal oscillation, which node is imparted to the band saw blade, in a substantially central section of a width with which the workpiece is cut off.

Any one of the 16th to 17th aspects makes it possible to effectively restrain the chatter oscillation, because the arrangement is made to cause the phase of the longitudinal oscillation which occurs to the band saw blade near the driving wheel to be substantially inverted to the phase of the longitudinal oscillation which occurs to the band saw blade near the driven wheel whereby the node for causing the oscillations to offset each other occurs in a vicinity of an area where the workpiece is cut with the band saw blade.

BRIEF DESCRIPTION OF THE DRAWINGS

FIGS. 4(A) and 4(B) are explanatory diagrams of a measurement result showing oscillations at the respective locations of the band saw blade in its rotational direction, which oscillations were observed when a workpiece was actually cut by oscillating the rotation of the motor while applying the pulses with the various frequencies to the motor.

FIGS. 6(A) and 6(B) are other explanatory diagrams of a result of measuring noises which occurred when the workpiece was actually cut.

FIGS. 7(A) and 7(B) are the other explanatory diagrams of a result of measuring noises which occurred when the workpiece was actually cut.

BEST MODES FOR CARRYING OUT THE INVENTION

Figure 1:
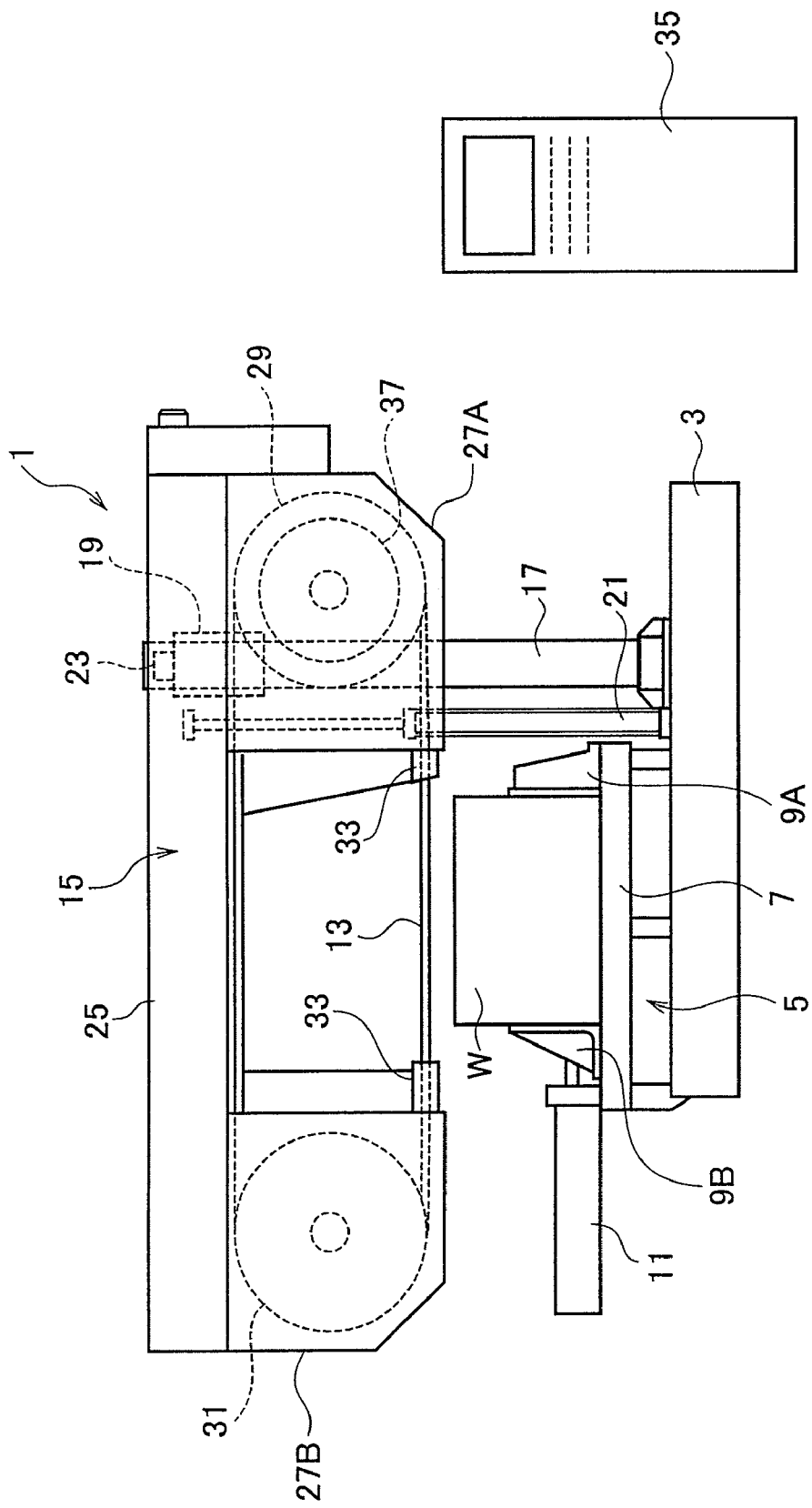
FIG. 1 is an explanatory diagram schematically showing an overall configuration of a horizontal band saw machine of a conventional type.

Descriptions will be provided below for embodiments of the present invention by use of the drawings. Components which play the same functions as those of the conventional type play are denoted by the same reference numerals, and the repeated descriptions will be omitted.

Figure 2:
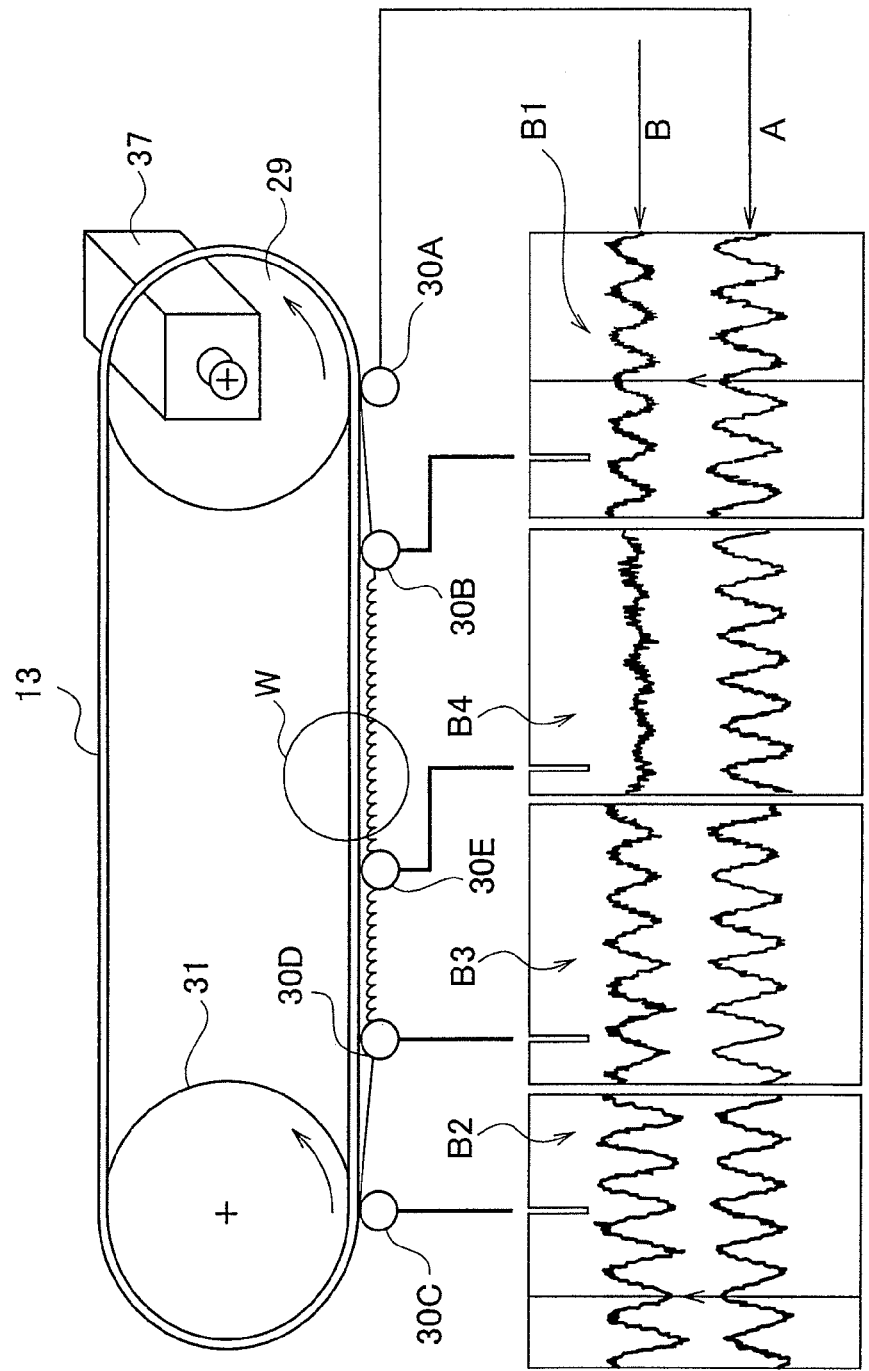
FIG. 2 is an explanatory configuration diagram conceptually and schematically showing a main configuration of a band saw machine according to an embodiment of the present invention.

As shown in FIG. 2, the configuration shown in FIG. 2 includes forced oscillation imparting means which imparts to the band saw blade 13 a forced longitudinal oscillation so that the phase of the oscillation which occurs to the band saw blade 13 in a main-component-force direction (in its rotational direction, in its running direction) (that is, the oscillation which occurs to the band saw blade 13 in its rotational direction or in its running direction, and which is a longitudinal or compressional oscillation) near the driving wheel 29 is substantially inverted to the phase of the oscillation which occurs to the band saw blade 13 in a main-component-force direction near the driven wheel 31. In other words, pulse applying means (its illustration is omitted from FIG. 2) included in the controller 35 applies to the motor 37 pulses with a frequency not less than the characteristic frequency of a system including the driving wheel 29, the driven wheel 31 and the band saw blade 13, that is, a band saw blade supporting system (pulses with a cycle smaller than the cycle corresponding to the characteristic frequency).

If, as described above, an oscillation is imparted to the motor 37 by momentarily accelerating and decelerating the rotation of the motor 37 in its rotational direction repeatedly alternately through applying to the motor 37 rectangular wave pulses with sharp rises and falls, the oscillation which is caused by repeatedly accelerating and decelerating the rotation of the driving wheel 29 in its rotational direction is transmitted to the driven wheel 31 via the band saw blade 13. When the pulses thus applied has an appropriate frequency, the oscillation which occurs to the band saw blade 13 in the main-component-force direction (in its rotational direction) near the driving wheel 29 is substantially inverted to the phase of the oscillation which occurs to the band saw blade 13 in the main-component-force direction near the driven wheel 31.

In other words, if the band saw blade 13 is suddenly (momentarily) accelerated and decelerated repeatedly alternately by applying to the motor 37 the pulses with the frequency not less than the characteristic frequency of the band saw blade supporting system while the band saw blade 13 is driven to run by the rotation of the motor 37, a moment occurs when the driven wheel 31 designed to be driven to rotate by using the band saw blade 13 as rotation transmitting means stops following the rotation of the driving wheel 29 due to an inertial force of the driven wheel 31 itself, a stretch of the band saw blade 13 and the like.

Specifically, because the rotational speed of the motor 37 for rotationally driving the driving wheel 29 is momentarily accelerated and decelerated repeatedly alternately, when the rotational speed is momentarily accelerated by applying the rectangular wave pulses to the motor 37, the lower portion of the band saw blade 13 (the portion with which the workpiece W is cut off) tends to be pulled momentarily whereas the upper portion of the band saw blade 13 tends to be compressed momentarily. Momentarily later, the band saw blade 13 is no longer pulled or compressed, and the band saw blade 13 accordingly oscillates in its running direction (in the main-component-force direction, in the vertical direction). Subsequently, the oscillation which occurs to the band saw blade 13 in the main-component-force direction is transmitted to the driven wheel 31, and thus the driven wheel 31 begins to oscillate in its rotational direction.

With this taken into consideration, pulses were applied to the motor 37 for the purpose of accelerating and decelerating the motor 37 with a frequency not less than the characteristic frequency, and a speed at which the driving wheel 29 rotated while the band saw blade was cutting in the air (air-cutting time) was detected by use of rotation detecting means 30A selected, for example, from a rotary pulse encoder, a tachogenerator and the like depending on the necessity. As a result, change in speed depending on the pulses applied to the motor 37 (a longitudinal oscillation forcefully imparted to the band saw blade 13 by applying the pulses to the motor 37, that is to say, an oscillation which occurred to the band saw blade 13 in the main-component-force direction due to the forced longitudinal oscillation) was detected as shown by a waveform A. In addition, a speed at which the band saw blade 13 rotated between the driving wheel 29 and the workpiece W (near the driving wheel 29) was detected by use of rotation detecting means 30B. As a result, a waveform with a phase which was almost as the same as the phase of the waveform A (an oscillation which occurred to the band saw blade 13 in the main-component-force direction due to the forced longitudinal oscillation) was detected as shown by a waveform B1.

In other words, if the band saw blade 13 is suddenly accelerated and decelerated (forcedly oscillated) by applying to the motor 37 the pulses with the frequency not less than the characteristic frequency of the band saw blade supporting system while the band saw blade 13 is driven to run by the rotation of the motor 37, a moment occurs when the driven wheel 31 designed to be driven to rotate by using the band saw blade 13 as the rotation transmitting means stops following the rotation of the driving wheel 29 due to the inertial force of the driven wheel 31 itself and the stretch of the band saw blade 13. With this taken into consideration, the pulses were applied to the motor 37 for the purpose of accelerating and decelerating the motor 37 with the frequency not less than the characteristic frequency, and the speed at which the driving wheel 29 rotated was detected by use of the rotation detecting means 30A selected, for example, from a rotary pulse encoder, a tachogenerator and the like depending on the necessity. As a result, the change in speed depending on the pulses applied to the motor 37 (the longitudinal oscillation which occurred in the main-component-force direction due to the forced oscillation) was detected as shown by a waveform A. In addition, the speed at which the band saw blade 13 rotated between the driving wheel 29 and the workpiece W (near the driving wheel 29) was detected by use of the rotation detecting means 30B. As a result, the waveform with the phase which was almost as the same as the phase of the waveform A (the longitudinal oscillation which occurred in the main-component-force direction due to the forced oscillation) was detected as shown by a waveform B1.

Furthermore, a rotational speed of the driven wheel 31 was detected by use of rotation detecting means 30C. As a result, a waveform with a phase substantially opposite to the phase of the waveform A (with a phase obtained by inverting the phase of the waveform A by almost 180 degrees) was detected (the oscillation which occurred in the main-component-force direction due to the forced longitudinal oscillation was detected), as shown by a waveform B2. Moreover, a speed at which the band saw blade 13 rotated between the driven wheel 31 and the workpiece W (near the driven wheel 31) was detected by use of rotation detecting means 30D. As a result, a waveform with a phase which was almost opposite to the phase of the waveform A was detected (the oscillation which occurred in the main-component-force direction due to the forced longitudinal oscillation was detected), as shown by a waveform B3.

As described above, the oscillation which occurred in the main-component-force direction near the driving wheel 29 due to the forced longitudinal oscillation had the waveform B1 whose phase was substantially inverted to the phase of the waveform B3 of the oscillation which occurred in the main-component-force direction near the driven wheel 31 due to the forced longitudinal oscillation. For this reason, a rotational speed of the band saw blade 13 near the workpiece W was detected by use of rotation detecting means 30E for the purpose of detecting a longitudinal oscillation of the band saw blade 13 at a location almost in the middle between the driving wheel 29 and the driven wheel 31, that is, in an area where the workpiece is cut off. As a result, a waveform damped through offsetting effects of the waveform B1 and the waveform B2 (a waveform indicating the oscillation which occurred in the main-component-force direction due to the forced longitudinal oscillation) was detected, as shown by a waveform B4. In sum, it was proved that the chatter oscillation was effectively restrained (checked).

As understandable from the foregoing descriptions, once forcefully imparting to the band saw blade 13 the oscillation which occurs to the driving wheel 29 in its rotational direction (being the same as the main-component-force direction of the band saw blade) when the rotational speed of the motor 37 is momentarily accelerated and decelerated repeatedly alternately through imparting to the motor 37 the pulses with the frequency not less than the characteristic frequency of the band saw blade supporting system, the oscillation, whose phase is inverted to the phase of the forced longitudinal oscillation which occurs to the driving wheel 29 in its rotational direction by approximately 180 degrees, occurs to the driven wheel 31 designed to be driven to rotate by use of the band saw blade 13 in its rotational direction.

In other words, when the chatter oscillation which occurs when the workpiece W is cut by use of the band saw blade 13 is intended to be restrained (checked), it serves the purpose if the forced oscillation (the longitudinal oscillation occurring in the running direction of the band saw blade 13 (in the main-component-force direction)) is imparted to the band saw blade 13 in order that the phase of the oscillation which occurs to the band saw blade 13 in the main-component-force direction near the driving wheel 29 can be almost opposite (can be inverted by approximately 180 degrees) to the phase of the oscillation which occurs to the band saw blade 13 in the main-component-force direction near the driven wheel 31.

In addition, because the band saw blade 13 suspended between the driving wheel 29 and the driven wheel 31 is influenced by the oscillation which occurs to the driving wheel 29 in its rotational direction and the oscillation which occurs to the driven wheel 31 in its rotational direction, the longitudinal oscillation, whose phase is almost similar to the phase of the oscillation which occurs to the driving wheel 29 in its rotational direction (the oscillation which occurs in the main-component-force direction), occurs to the band saw blade 13 near the driving wheel 29, whereas the longitudinal oscillation, whose phase is almost similar to the phase of the oscillation which occurs to the driven wheel 31 in its rotational direction (the oscillation which occurs in the main-component-force direction), occurs to the band saw blade 13 near the driven wheel 31. In sum, the oscillations in the main-component-force direction, whose phases are substantially inverted to each other, occur respectively to the band saw blade 13 near the driving wheel 29 and the band saw blade 13 near the driven wheel 31.

Furthermore, at a location where the oscillation which occurs to the band saw blade 13 in the main-component-force direction near the driving wheel 29 and the oscillation which occurs to the band saw blade 13 in the main-component-force direction near the driven wheel 31 cross over each other (at a location in the middle between the driving wheel 29 and the driven wheel 31), an area to which no oscillation occurs as a result of the oscillations offsetting each other, that is, a node, takes place. Once a node of the oscillation of the band saw blade 13 in the main-component-force direction (in its rotational direction) is formed between the driving wheel 29 and the driven wheel 31, the node blocks the longitudinal oscillation of the band saw blade 13 itself which tends to reciprocate between the driving wheel 29 and the driven wheel 31. This makes it possible to restrain (check) the frictional chatter oscillation.

As understandable from the foregoing descriptions, when the chatter oscillation which occurs while the workpiece W is being cut is intended to be restrained (checked), it serves the purpose if the forced longitudinal oscillation (the longitudinal oscillation occurring in the running direction of the band saw blade 13 (in the main-component-force direction)) is imparted to the band saw blade 13 in order that the phase of the oscillation which occurs to the band saw blade 13 in the main-component-force direction near the driving wheel 29 can be almost opposite (can be inverted by approximately 180 degrees) to the phase of the oscillation which occurs to the band saw blade 13 in the main-component-force direction near the driven wheel 31. With this taken into consideration, aiming at restraining noises, which occur due to the chatter oscillation, by momentarily accelerating and decelerating the driving wheel 37 in its rotational direction repeatedly alternately, an experiment was made for the purpose of proving what frequency was appropriate for pulses to be imparted to the driving motor 37.

For the reference, the band saw blade 13 generally ranges from a band saw blade with a 27-mm width and a 0.95-mm thickness to a band saw blade with an 80-mm width and a 1.6-mm thickness. When a workpiece is cut by use of this type of band saw blade, an oscillation is likely to occur to the band saw blade in its running direction due to change in cutting resistance. It is known that the oscillation which occurs to the band saw blade in its running direction induces a frictional chatter oscillation so that extremely unpleasant noises are caused in conjunction with the tooth edges of the band saw blade 13 become abraded. The frequency of the unpleasant noises, that is, the frequency which occurs due to a frictional chatter oscillation, varies depending on how many tooth edges the band saw blade has, and on what type the band saw blade is of. It is empirically known that the frequency is 700 Hz to 20000 Hz.

A band saw blade with a 67-mm thickness and a 1.6-mm thickness was used for the experiment. The oscillation was measured (detected) under a condition that the saw speed was 52 m/min. A pulsed change (±8 m/min) was imparted to the saw speed by imparting pulses to the driving motor 37 in order that change in the speed at which the band saw blade runs in its running direction (change in the speed at which the driving wheel 29 rotates in its rotational direction) could be equal to ±8 m/min. In other words, ±8 m/min was a speed which was added to, and subtracted from, the saw speed when the band saw blade was momentarily accelerated, and decelerated, by the oscillation which occurred to the driving wheel 37 in its rotational direction.

First of all, the oscillation which occurred to the band saw blade 13 in its running direction (in the main-component-force direction) was detected at the following locations for the purpose of comparing the oscillation which occurred thereto while the workpiece W was being cut with the oscillation which occurred thereto while no workpiece W was being cut so that no load was imposed on the band saw blade 13 (air-cutting time). Specifically, a location X1 shown in FIGS. 3(A) and 3(B) was a location on the driving wheel 29; X2, a location between the driving wheel 29 and the band saw blade guide 33 near the driving wheel; X3, a location which is between the band saw blade guide 33 and the driving wheel 29, and which is close to the band saw blade 33; X4, a location between the workpiece W and the band saw guide 33 near the driven wheel 31; X5, a location which is between the driven wheel 31 and the band saw blade guide 33 near the driven wheel 31, and which is close to the band saw blade guide 33; X6, a location between the driven wheel 31 and the band saw blade guide 33; and X7, a location on the driven wheel 31.

When the experiment was started, the oscillation which occurred to the band saw blade in the main-component-force direction when the band saw blade was constantly rotated at the saw speed of 52 m/min was measured at the locations X1, X2, X3, X4, X5, X6 and X7, and subsequently the oscillation which occurred to the band saw blade at the location X1 was compared with the oscillation which occurred to the band saw blade at each of the locations X2 to X7. A result of the comparison is shown in the first row in a table of FIG. 3(B). In sum, because the motor 37 constantly rotated, the band saw blade constantly rotated with no largely-fluctuating oscillation being detected, although a more or less oscillation causing noises was observed at each of the locations X1 to X7.

Subsequently, rectangular wave pulses with a frequency of 58 Hz were applied to the motor 37 for the purpose of imparting to the motor 37 an oscillation in its rotational direction (in the main-component-force direction of the band saw blade). A result of the impartation is shown in the second row of the table of FIG. 3(B). The phase of the oscillation at the location X1 was almost the same as the phase of the oscillation at each of the locations X2 to X7. Afterward, the motor 37 was oscillated by imparting to the motor 37 pulses with a frequency of 88 Hz which represented the resonance point (the characteristic frequency). A result of the oscillation is shown in the third row in the table of FIG. 3(B). Specifically, in this case, no oscillation apparently occurred to the band saw blade at the location X1 on the driving wheel 29, and the oscillation was almost similar to the oscillation which had occurred there when the motor constantly rotated. However, it is learned that the oscillation became larger, and were resonated, from the location X2 to the location X7.

Thereafter, the rotation of the motor 37 was oscillated by applying to the motor 37 pulses with a frequency of 102 Hz for the purpose of imparting to the motor 37 an oscillation with a frequency not less than the characteristic frequency. A result of this case is shown in the fourth row in the table of FIG. 3(B). In this case, the oscillation was restrained (checked) at each of the locations X2 and X3 (the locations between the workpiece W and the driving wheel 29), and the oscillation became larger from the location X4 to the location X7, relative to the oscillation at the location X1. In addition, as clear from the table, it is learned that the phase of the oscillation at each of the locations X2 to X7 was substantially inverted to the phase of the oscillation at the location X1.

After that, the rotation of the motor 37 was oscillated by imparting to the motor 37 pulses with a frequency of 116 Hz. A result of this case is shown in the fifth row in the table of FIG. 3(B). In this case, it is learned from a comparison that the phase of the oscillation at the location X1 was almost as the same as the phase of the oscillation at each of the locations X2 and X3. In addition, the phase of the oscillation at each of the locations X4 to X7 was substantially inverted to the phase of the oscillation at the location X1, and the oscillation became larger from the location X4 to the location X7. From the foregoing descriptions, it is learned that a node of the oscillation of the band saw blade in the main-component-force direction took place between the location X3 and the location X4.

Subsequently, the rotation of the motor 37 was oscillated by applying to the motor 37 pulses with a frequency of 127 Hz in order that the ratio of the amplitude of the oscillation which occurred to the band saw blade 13 near the driving wheel 29 to the amplitude of the oscillation which occurred to the band saw blade 13 near the driven wheel 31 could be equal to one. A result of this case is shown in the 6th row in the table of FIG. 3(B). In this case, the phase of the oscillation at the location X1 was almost the same as the phase of the oscillation at each of the locations X2 and X3. The phase of the oscillation at each of the locations X5 to X7 was substantially inverted to the phase of the oscillation at the location X1. In addition, the oscillation at the location X4 was restrained (checked). In this case, it is learned that a node took place at a location which was close to the location X4, and which was near the workpiece.

Thereafter, the motor 37 was oscillated by applying to the motor 37 pulses with a frequency of 135 Hz in order that the amplitude ratio could be equal to 0.78. A result of this case is shown in the 7th row in the table of FIG. 3(B). In this case, the phase of the oscillation at each of the locations X2 and X3 was almost as the same as the phase of the oscillation at the location X1. The phase of the oscillation at each of the locations X5 to X7 was inverted to the phase of the oscillation at the location X1. In addition, the oscillation at the location X4 was restrained, and the phase of the oscillation there was almost the same as the phase of the oscillation at the location X1. As a result, it is learned that a node took place at a location which was close to the location X4, and which was near the driven wheel 31.

As described above, when the rotation of the driving wheel 29 was oscillated by oscillating the rotation of the motor 37 while applying the motor 37 the pulses with the frequencies not less than the characteristic frequency, the nodes took place due to the oscillations of the band saw blade in the main-component-force direction (the longitudinal oscillations of the band saw blade). As the frequency of the pulses applied to the motor 37 was made gradually larger, this enlargement moved the location where the node took place from the location near the driving wheel 29 to the location near the driven wheel 31. In addition, when the rotation of the motor 37 was oscillated by applying to the motor 37 the pulses with a frequency of 127 Hz which caused the amplitude of the oscillation which occurred to the band saw blade 13 near the driving wheel 29 to be equal to the amplitude of the oscillation which occurred to the band saw blade 13 near the driven wheel 31, that is, which caused the amplitude ratio to be equal to one, the node could be made at a location almost in the middle between the driving wheel 29 and the driven wheel 31.

In sum, even in a case where the center position of the workpiece W shown in FIG. 1 in the right-left direction moves rightward or leftward depending on how large or small the workpiece W is when the workpiece W is going to be cut off while being held by the vise device 5, the node can be made in a vicinity of the center position of the workpiece W (a near-center position of the width with which the workpiece is cut off) by setting up an appropriate frequency for the pulses applied to the motor 37. This makes it possible to cut off the workpiece in an area where the longitudinal oscillation of the band saw blade is restrained, and accordingly to enhance the precision with which the workpiece is cut off.

The location almost in the middle between the driving wheel 29 and the driven wheel 31 almost agrees with the area where the workpiece W is cut off. For this reason, it is desirable that the frequency of the pulses applied to the motor 37 should be in a range of 116 Hz to 135 Hz around 127 Hz.

Figure 3:
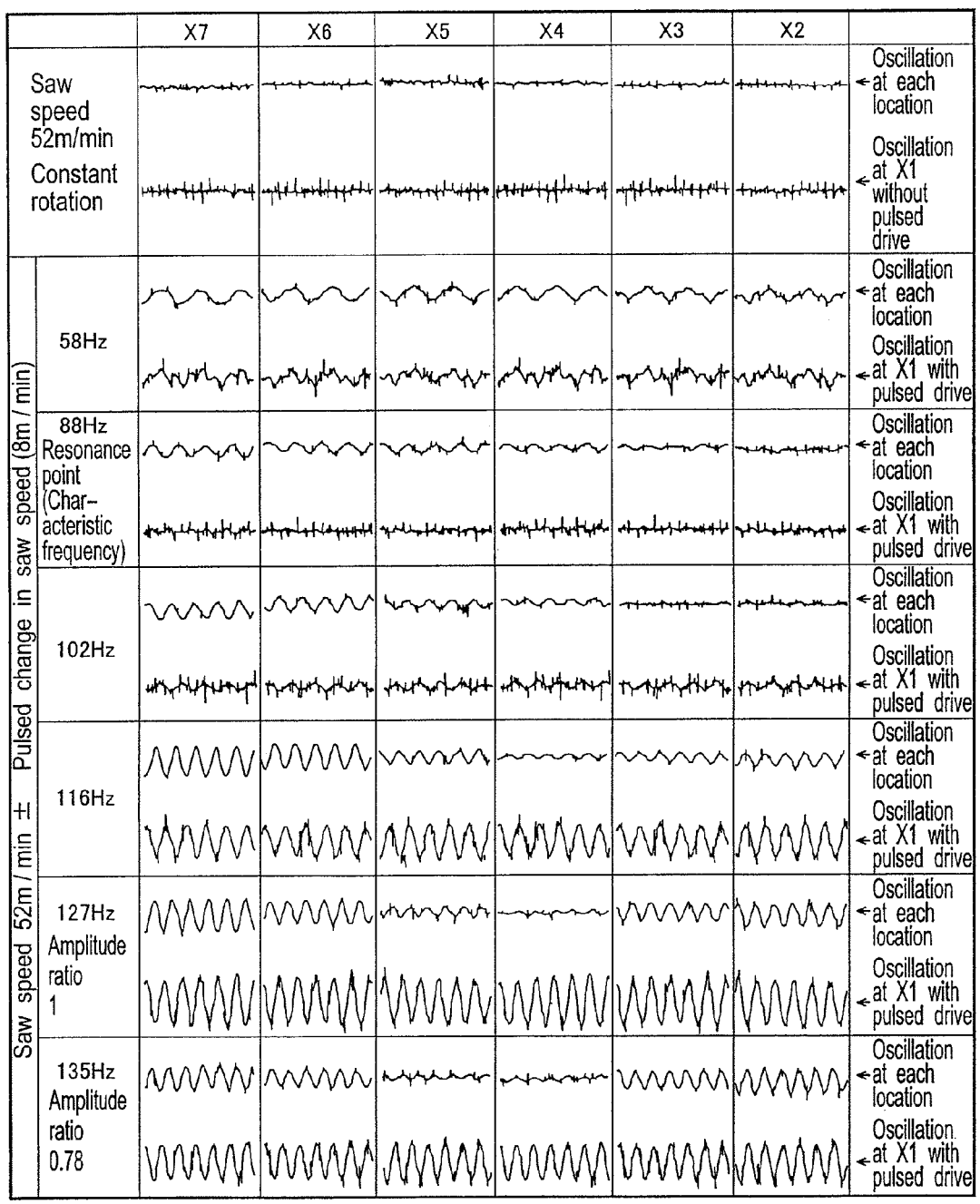
FIGS. 3(A) and 3(B) are explanatory diagrams of a measurement result showing oscillations at the respective locations of a band saw blade in its rotational direction (in a main-component-force direction), which oscillations were observed when the band saw blade cuts in the air by oscillating a rotation of a motor while applying pulses with various frequencies to the motor.
Figure 5:
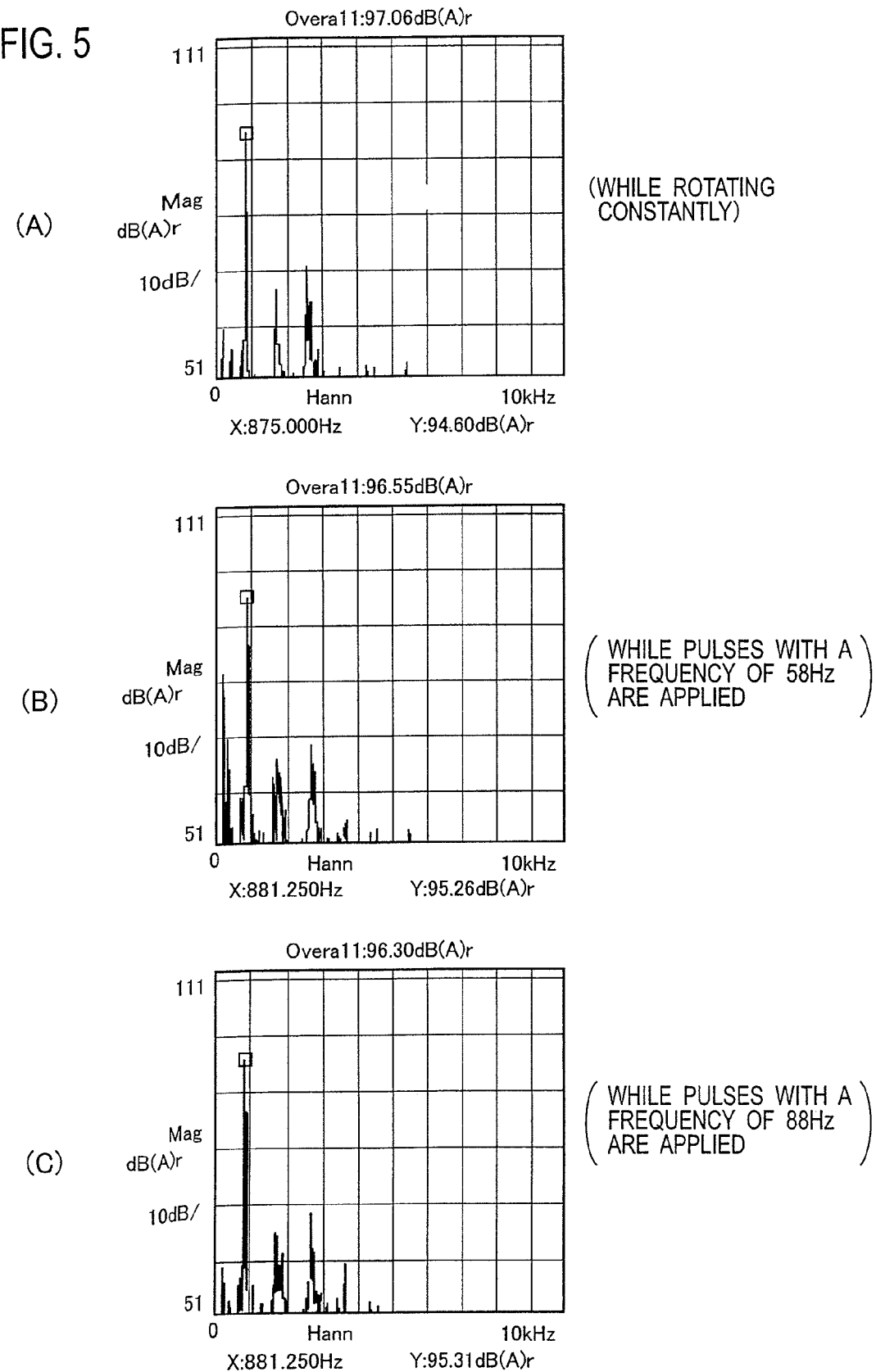
FIGS. 5(A), 5(B) and 5(C) are explanatory diagrams of a result of measuring noises which occurred when the workpiece was actually cut.

Subsequently, a SUS304 round bar with a diameter of 400 mm as a workpiece W was actually cut at a metal removal rate of 60 cm$^2$/min. A result of a measurement using conditions which are the same as those shown in FIGS. 3(A) and 3(B) is shown in FIGS. 4(A) and 4(B). As clear from FIGS. 4(A) and 4(B), a frictional chatter oscillation which occurred while the workpiece W was being cut was superimposed on the oscillation of the band saw blade 13 in the main-component-force direction (the forced longitudinal oscillation forcefully imparted to the band saw blade 13 by oscillating the rotation of the motor 37), which has been shown in FIGS. 3(A) and 3(B). It is learned that the chatter oscillation disappeared when the rotation of the motor 37 was oscillated by imparting to the motor 37 pulses with a frequency which generated the node of the forced longitudinal oscillation at a location almost in the middle between the driving wheel 29 and the driven wheel 31, that is, with a frequency of 116 Hz.

In other words, the occurrence of the node to the band saw blade 13 at the location almost in the middle between the driving wheel 29 and the driven wheel 31 due to the forced longitudinal oscillation means that the workpiece W is cut off in the vicinity of the location where the node occurs to the band saw blade 13. For this reason, the chatter oscillation which occurs due to the friction between the workpiece W and the band saw blade 13 is effectively restrained (checked). Specifically, because the chatter oscillation which takes place while the workpiece W is being cut is superimposed on the forced longitudinal oscillation, while the chatter oscillation is being transmitted through the band saw blade 13 in the longitudinal direction of the band saw blade 13, the chatter oscillation is blocked at the location where the node occurs. The chatter oscillation is restrained in this manner. In sum, the chatter oscillation can be restrained if a location where a node is intended to occur by imparting a forced longitudinal oscillation to the band saw blade 13 is a location at which the superimposed chatter oscillation is blocked from reciprocating between the driving wheel 29 and the driven wheel 31, that is to say, a location between the driving wheel 29 and the driven wheel 31.

FIGS. 5(A) to 7(B) show values representing noises which were measured when the workpiece W was cut while oscillating the rotation of the driving wheel 29 by oscillating the rotation of the motor 37. It should be noted that, in FIGS. 5(A) to 7(B), "overall: xxx dB(A)r" denotes an overall sound pressure; and "Mag" means Magnitude, and indicates how large or small the measured values were. In addition, "Hann" denotes a window function termed as the Hanning window. Moreover, "X: xxx Hz" denotes a peak frequency; and "Y: xxx dB(A)r," a peak sound pressure.

FIG. 5(A) shows a result of measuring an oscillation noise which occurred during a normal cutting operation (during a cutting operation corresponding to the first row in the table of FIG. 4(B)). In this case, the peak frequency was 875 Hz, and the noise value was approximately 97.1 dB(A). Subsequently, a noise was measured when the rotation of the motor 37 was oscillated by applying to the motor 37 pulses with a frequency of 58 Hz as shown in the second row in the table of FIG. 4(B). The value representing the noise was as shown in FIG. 5(B). The peak frequency was 881.250 Hz, and the overall noise power was approximately 96.6 dB(A). When the rotation of the motor 37 was oscillated by applying to the motor 37 pulses with a frequency of 88 Hz as shown in the third row in the table of FIG. 4(B), a result of the measurement was as shown in FIG. 5(C). The peak frequency was 881.250 Hz, and the overall noise power was approximately 97.3 dB(A).

When the rotation of the motor 37 was oscillates by applying to the motor 37 pulses with a frequency of 102 Hz as shown in the fourth row in the table of FIG. 4(B), a result of the measurement was as shown in FIG. 6(A). The peak frequency was 881.250 Hz, and the overall noise power was approximately 93.38 dB(A). When the rotation of the motor 37 was oscillated by applying to the motor 37 pulses with frequencies of 116 Hz, 127 Hz and 135 Hz respectively as shown in the 5th, 6th and 7th rows in the table of FIG. 4(B), results of the measurements were as shown in FIGS. 6(B), 7(A) and 7(B). The peak frequencies were 837.500 Hz, 125.000 Hz and 837.500 Hz, and the overall noise powers were approximately 78.4 dB(A), approximately 77 dB(A) and approximately 77.49 dB(A), respectively.

Figure 8:
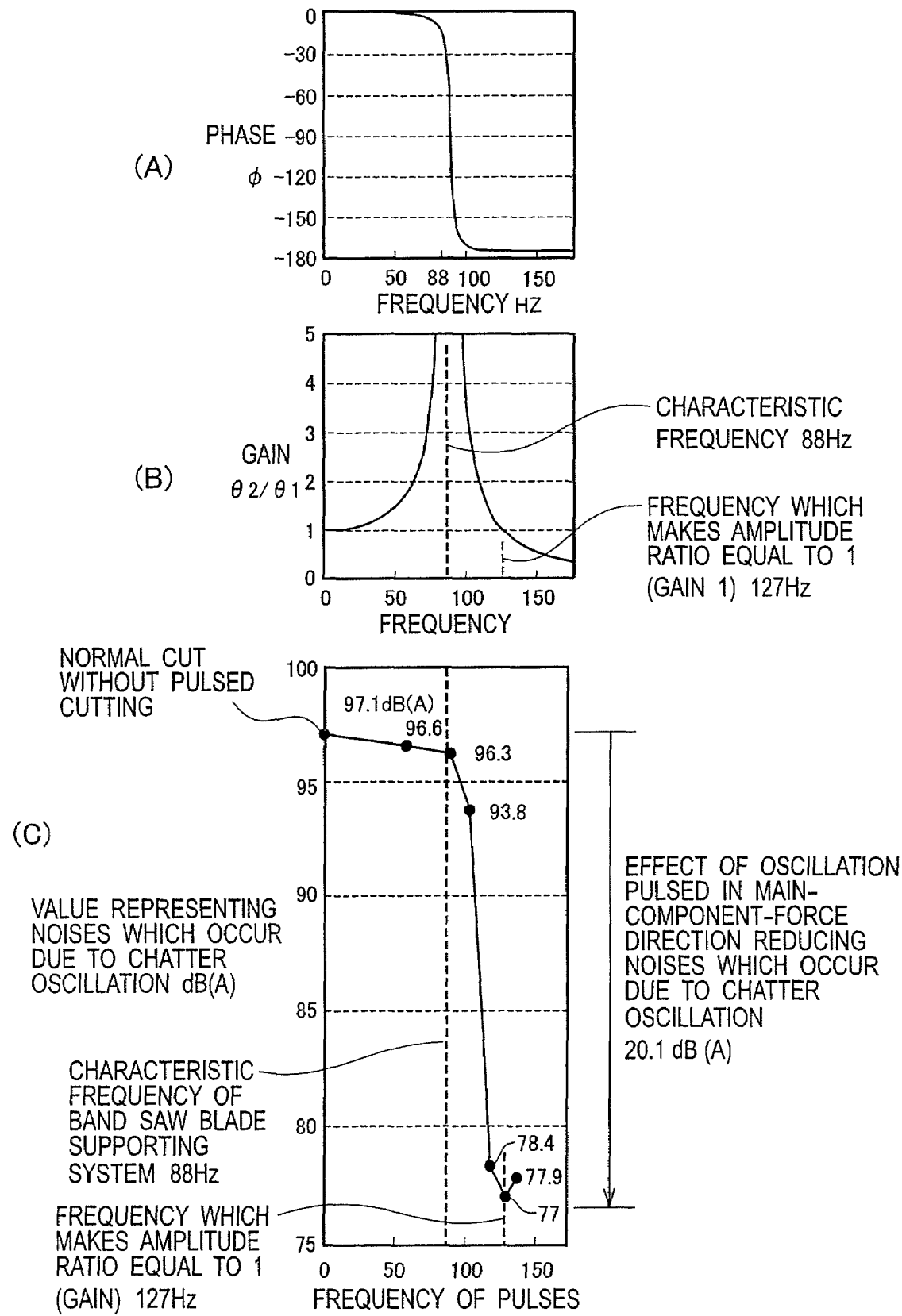
FIGS. 8(A), 8(B) and 8(C) are explanatory diagrams showing a relationship among a phase curve, a resonance curve and noise values on the basis of the measurement result.

The summary of the foregoing results is as shown in FIG. 8(A). When the rotation of the driving wheel 29 was oscillated by applying to the motor 37 the pulses with a frequency of 88 Hz which was equal to the characteristic frequency, the phase of the oscillation which occurred to the band saw blade 13 in the main-component-force direction near the driving wheel 29 was inverted to the phase of the oscillation which occurred to the band saw blade 13 in the main-component-force direction near the driven wheel 31, as shown by a phase curve in FIG. 8(A). In addition, a value representing the noise which occurred due to the chatter oscillation sharply decreased when the rotation of the motor 37 was oscillated by applying to the motor 37 the pulses with a frequency not less than the characteristic frequency, as shown in FIG. 8(C). The noise value became the smallest when the rotation of the motor 37 was oscillated by applying to the motor 37 the pulses having a frequency of 127 Hz with which pulses the ratios of the amplitude of the oscillation that occurred to the band saw blade 13 near the driving wheel 29 and near the driven wheel 31 became equal to one. The difference between the smallest noise value and the noise value (approximately 97.1 dB(A) which was measure during the normal cutting operation was approximately 20.1 dB(A).

In sum, judging from the result of measuring the noises, it is desirable that the frequency of the pulses to be applied to the motor 37 (the frequency of the pulses to be applied to the motor 37 for the purpose of oscillating the rotation of the motor 37) should be in a range of 116 Hz to 135 Hz, and it is the most desirable that the frequency should be 127 Hz.

It should be noted that the sound pressure (noise value) (dB) can be expressed with the following equation.

$$A\,(\mathrm{dB}) = 20 * \log_{10} \frac{V_2}{V_1} \qquad \text{[Equation 1]}$$

where $V_1$ denotes a reference voltage and $V_2$ denotes a voltage to be measured.

Based on this, when the noise value decreases by 20 dB in this case, the noise is reduced to one tenth as follows.

$$-20\,dB = 20*\log_{10}\frac{V_2}{V_1}$$

$$\log_{10}\frac{V_2}{V_1} = \frac{-20}{20} = -1$$

$$10^{-1} = \frac{V_2}{V_1} \quad V_2 = \frac{1}{10}\cdot V_1$$

Figure 9:
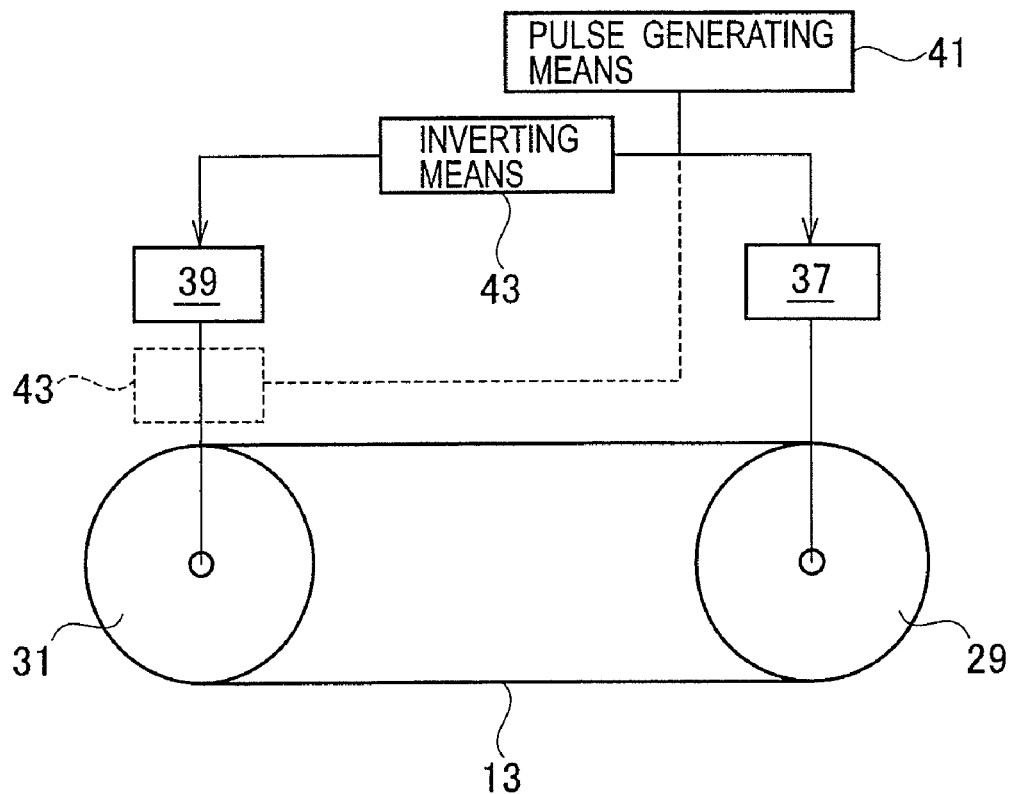
FIG. 9 is an explanatory configuration diagram conceptually and schematically showing a main configuration of a band saw blade according to a second embodiment of the present invention.

Instead of the configuration in which, as described above, pulses with a frequency not less than the characteristic frequency are applied to the motor 37, the following configuration can be also used as the configuration in which the forced longitudinal oscillation is imparted to the band saw blade in the main-component-force direction. Specifically, in a case of an embodiment conceptually shown in FIG. 9, a motor 39 similar to the motor 37 for rotating the driving wheel 29 is connected and linked to the driven wheel 31, as shown in FIG. 9. In addition, this configuration includes pulse applying means that applies to the motors 37 and 39 the respective pulses whose phases are opposite to each other while the motors 37 and 39 are synchronously rotated under the control of the controller 35. Specifically, in this configuration, rectangular wave pulses generated by pulse generating means 41 serving as forced oscillation imparting means is applied to one of the motors 37 and 39, whereas pulses whose phase is inverted to the phase of the pulses by pulse inverting means 43 is applied to the other of the motors 37 and 39.

With this configuration, positive pulses are applied to one of the motors 37 and 39 which are synchronously rotating, whereas negative pulses are applied to the other of the motors 37 and 39. As a result, for example, the motor 37 is forcedly accelerated with positive pulses momentarily, whereas the motor 39 is forcedly decelerated with negative pulses momentarily. Consequently, the band saw blade 13 is forcedly accelerated by the rotation of the motor 37 momentarily, whereas the band saw blade 13 is forcedly decelerated by the rotation of the motor 39 momentarily.

Accordingly, the phase of the longitudinal oscillation which is forcefully imparted to the band saw blade 13 by the driving wheel 29 rotated by the motor 37 is inverted, by approximately 180 degrees, to the phase of the oscillation which is forcefully imparted to the band saw blade 13 by the driven wheel 31 rotated by the motor 39. The oscillation in the main-component-force direction (the longitudinal oscillation) near the driving wheel 29 and the oscillation in the main-component-force direction (the longitudinal oscillation) near the driven wheel 31 offset each other in the vicinity of the area in which the workpiece is cut, and which area is between the driving wheel 29 and the driven wheel 31, because the oscillations have the phases which are opposite to each other as described above. Thereby, the oscillation of the band saw blade in the main-component-force direction (the longitudinal oscillation of the band saw blade) is restrained (checked). In sum, the chatter oscillation of the band saw blade 13 is restrained, and thus the noises are caused to disappear, as in the case of the foregoing configuration.

The foregoing description has been provided for the case where the motor 39 is forcedly accelerated and decelerated repeatedly alternately for a moment by applying pulses whose phases are inverted to each other by 180 degrees (pulses with opposite phases) to the motor 37 for rotating the driving wheel 29 and the motor 39 for rotating the driven wheel 31. Nevertheless, a configuration in which, instead of the motor 39, for example, braking apparatus 43 is adopted can be used. In the case of the configuration in which the braking apparatus 43 is adopted, pulses generated by the pulse generating means 41 are applied to the motor 37 and the braking apparatus 43 without inverting the pulses.

Specifically, in the case of the foregoing configuration, when he pulses generated by the pulse generating means 41 are applied to the motor 37 and the braking apparatus 43 simultaneously, the motor 37 is forcedly accelerated momentarily whereas the braking apparatus 43 forcedly brakes and decelerates the rotation of the driven wheel 43 momentarily. As a result, this configuration repeats momentary accelerations and decelerations alternately, and thus brings about the same operation and effect as the previously-described configuration does.

Figure 10:
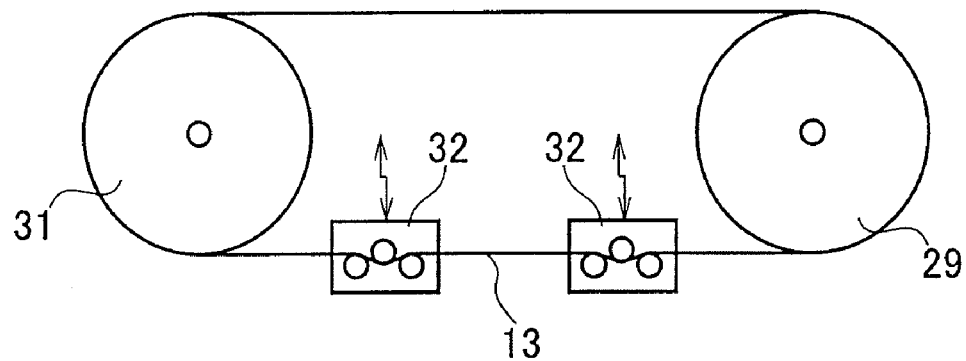
FIG. 10 is an explanatory configuration diagram conceptually and schematically showing a main configuration of a band saw blade according to a third embodiment of the present invention.

A configuration including, as shown in FIG. 10, multiple pinch roller units 32 each for forcedly curving part of the band saw blade 13 repeatedly periodically or randomly can be also used as the configuration for forcefully imparting the longitudinal oscillation (the oscillation in the main-component-force direction) to the band saw blade 13. The configuration including the pinch roller units 32 momentarily curves the band saw blade 13 repeatedly, and is thus capable of forcefully imparting the longitudinal oscillation to the band saw blade 13 by momentarily accelerating and decelerating the band saw blade 13 repeatedly. This configuration is capable of restraining the chatter oscillation as in the case of the previously-described configuration.

Figure 11:
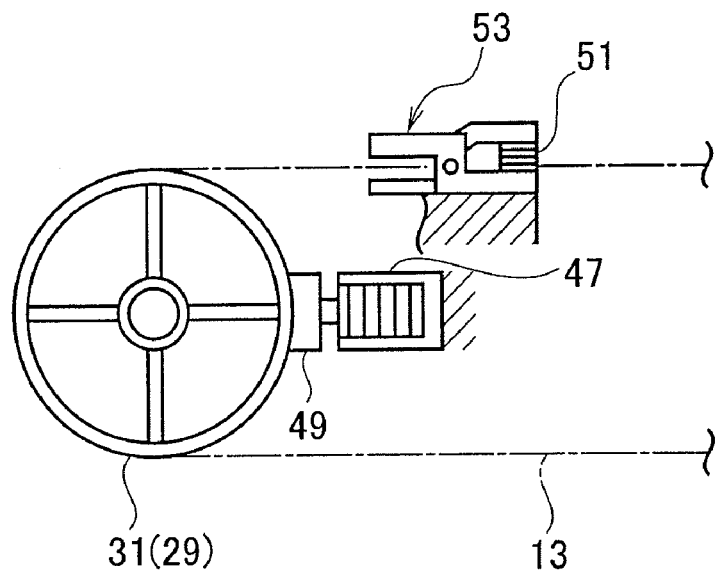
FIG. 11 is an explanatory diagram showing a configuration which momentarily brakes and decelerates a driving wheel, a driven wheel or the band saw blade.

As understandable from the foregoing descriptions, the impartation of the oscillation in the main-component-force direction to the band saw blade 13 by forcedly accelerating and decelerating the band saw blade 13 for a moment serves the purpose of restraining the chatter oscillation (longitudinal oscillation) which occurs to the band saw blade 13 in its running direction (the main-component-force direction) while the workpiece W is being cut off by use of the band saw blade 13. For this reason, a configuration can be adopted which, for example, as shown in FIG. 11, causes a damper 49 to instantaneously brake, and thereby momentarily forcedly decelerate, at least one of the driving wheel 29 and the driven wheel 31 by pressing one of the driving wheel 29 and the driven wheel 31, or by pressing both of the driving wheel 29 and the driven wheel 31 at a time or with a slight time difference through an operation of an actuator 47 included in the machine body of the band saw machine, the actuator 47 being selected, for example, from a solenoid and a piezoelectric actuator and the like depending on the necessity. In addition, as the configuration which causes the band saw blade 13 to be instantaneously forcedly decelerated, a configuration can be adopted which, as shown in FIG. 10, causes the running band saw blade 13 to be momentarily clamped and unclamped repeatedly alternately by use of clamps 53 which are instantaneously opened and closed by the respective actuators 51 provided at multiple locations in the machine body with slight time differences.

Figure 12:
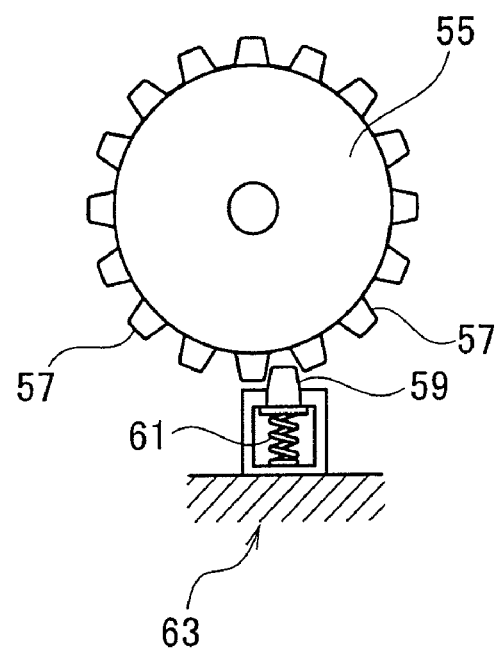
FIG. 12 is an explanatory diagram showing another configuration which momentarily brakes and decelerates the driving wheel, the driven wheel or the band saw blade.

A configuration can be also adopted which, as shown in FIG. 12, includes a rotary wheel 55 which rotates coaxially and integrally with the driving wheel 29 and/or the driven wheel 31, and which causes the machine body to have a plunger device 63 including a retractable pin or ball plunger 59, which abuts multiple protrusions (extrusions) 57 provided in the circumferential surface of the rotary wheel 55 at appropriate intervals, and which are biased in its protruding direction by use of an elastic member 61 such as a spring.

The foregoing configuration momentarily decelerates the rotation of the rotary wheel 55 when each of the protrusions 57 provided to the rotary wheel 55 abuts on the plunger 59 in the plunger devices 63. Subsequently, the rotational speed of the rotary wheel 55 returns to normal once the protrusion 57 goes over the plunger 59 after the protrusion 57 presses the plunger 59 against the biasing force of the elastic member 61. In sum, because the rotary wheel 55 is designed to be rotated while repeating the accelerations and decelerations alternately, the driving wheel 29 and/or the driven wheel 31 which is designed to rotate integrally with this rotary wheel 55 also rotates in the same manner as the rotary wheel 51 rotates. This makes it possible to forcefully impart the longitudinal oscillation to the band saw blade 13 suspended between the driving wheel 29 and the driven wheel 31.

It should be noted that the location at which the protrusions 57 are provided is set up relative to the location at which the plunger devices 63 is provide, and vice versa. For this reason, a configuration can be adopted in which the rotary wheel 55 includes multiple plunger devices 63, and in which the machine body is provided with the protrusion 57. Furthermore, the foregoing configuration may further include a configuration in which a torsion spring or the like is interposed between the rotary wheel 55 and a rotary shaft upon which the rotary wheel 55 pivots, and in which the rotary wheel 55 rotates about the rotary shaft slightly rotatably. This configuration causes the torsion spring to accumulate its biasing force when the protrusion 57 abuts each of the plungers 59, and momentarily releases the biasing force accumulated in the torsion spring when the protrusion 57 goes over the plunger 59, hence accelerating the rotary wheel 55 in its rotational direction forcedly. This makes it possible to cause the rotary wheel 55, which is rotating as a result of this acceleration, to abut on part of the driving wheel 29 and the driven wheel 31, and accordingly to momentarily accelerate the driving wheel 29 and the driven wheel 31 forcedly.

This foregoing configuration makes it possible to cause the rotary wheel 55 to impart the oscillation to the band saw blade 13 by momentarily decelerating and accelerating the band saw blade 13 in its running direction repeatedly alternately. This configuration is capable of restraining the chatter oscillation of the band saw blade 13 as in the case of the previously-described configuration.

Moreover, as the configuration which forcefully imparts the longitudinal oscillation to the band saw blade 13 for the purpose of restraining the chatter oscillation of the band saw blade 13, a configuration can be adopted which imparts to the driving wheel 29 and/or the driven wheel 31 impacts (striking pressures), which impinge upon the driving wheel 29 and/or the driven wheel 31 in its rotational direction, by use of a striking tool such as a hammer. In sum, various configurations can be adopted as the configuration which forcefully imparts the longitudinal oscillation to the band saw blade 13 for the purpose of restraining the chatter oscillation of the band saw blade 13.

Figure 13:
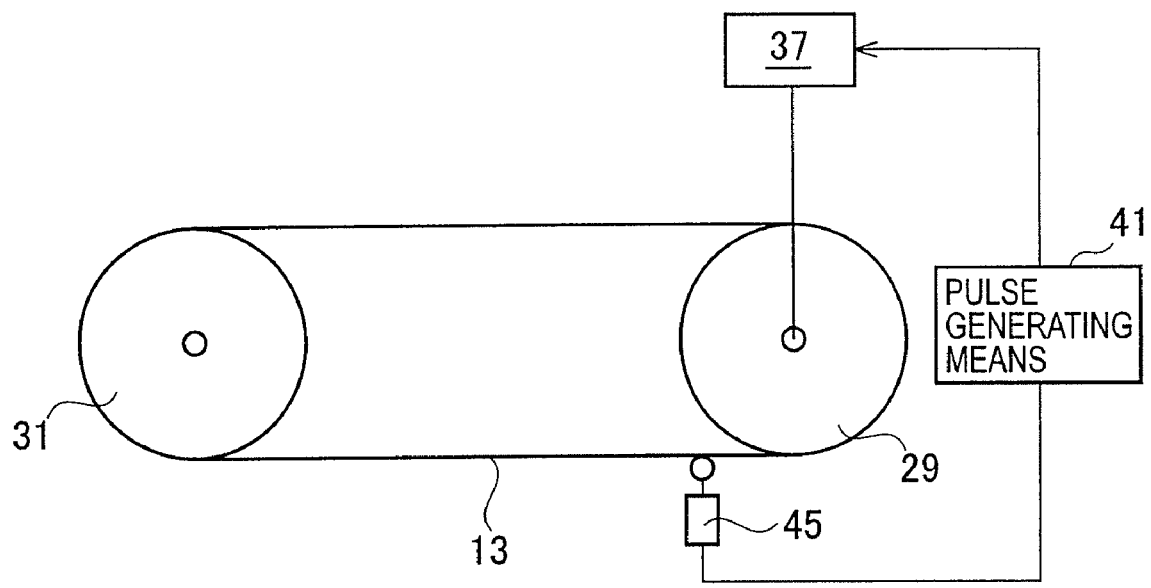
FIG. 13 is an explanatory configuration diagram conceptually and schematically showing a main configuration of a band saw blade according to a fourth embodiment of the present invention.

FIG. 13 shows still another embodiment of the present invention. This embodiment has a configuration including chatter oscillation detecting means 45 for detecting the chatter oscillation of the band saw blade 13. This chatter oscillation detecting means 45 has a configuration similar to that of the rotation detecting means, and is electrically connected to the pulse generating means 41.

In the case of the configuration, once the chatter oscillation of the band saw blade 13 is detected by the chatter oscillation detecting means 45, the waveform of the oscillation is inputted to the pulse generating means 41. This pulse generating means 41 amplifies the inputted waveform of the oscillation, and turns the resultant waveform of the oscillation into pulses. In addition, the pulse generating means 41 applies to the motor 37 pulses having a phase which is obtained by inverting the phase of the pulses by 180 degrees. As a result, the driving wheel 29 is oscillated in its rotational direction by use of the pulses applied to the motor 37 with the phase which is obtained by inverting the phase of the longitudinal oscillation detected by the chatter oscillation detecting means 45. This configuration imparts to the band saw blade 13 a longitudinal oscillation with a phase opposite to the phase of the chatter oscillation of the band saw blade 13 for offsetting the chatter oscillation of the band saw blade 13.

A common characteristic frequency among generally-used band saw machines is in a range of 70 Hz to 200 Hz. If a database is beforehand organized for cycles and frequencies of the respective pulses produced by the pulse generating means 41 within this range, a configuration can be also adopted in which: when noises occur due to a chatter oscillation while the workpiece W is being cut off by use of the band saw blade 13, pulses with a frequency retrieved from the database depending on the necessity is imparted to the motor, and thus the longitudinal oscillation is repeatedly imparted to the band saw blade 13 for the appropriate number of times; and, when the noises which occur due to the chatter oscillation are reduced to some extent, the pulses with the retrieved frequency are repeatedly applied to the motor. In other words, this configuration aims at reducing noises which occur due to a chatter oscillation by experimentally applying, to the motor, pulses with one of frequencies beforehand set up.

It should be noted that the description of the present application incorporates, as references, all of the contents described in Japanese Patent Applications Nos. 2005-150053 (filed on May 23, 2005), 2006-005128 (filed on Jan. 12, 2006), 2006-050617 (filed on Feb. 27, 2006) and 2006-050704 (filed on Feb. 27, 2006).

The present invention shall not be limited to the descriptions which have been made for the foregoing embodiments of the present invention. The present invention can be carried out with other various embodiments by modifying the present invention depending on the necessity.

The invention claimed is:

1. A method of cutting off a workpiece using a band saw blade, comprising:
   suspending the band saw blade between a first wheel and a second wheel;
   applying at least a first series of driving pulses and a second series of driving pulses to a first motor rotating the first wheel and a second motor rotating the second wheel, respectively, wherein the first series of pulses have phases opposite to the second series of pulses; and
   cutting the workpiece with the band saw blade.

2. A band saw machine comprising:
   a first wheel;
   a second wheel;
   a band saw blade suspended between the first wheel and the second wheel;
   a first motor rotating the first wheel;
   a second motor rotating the second wheel; and
   a pulse applying module that applies at least a first series of driving pulses and a second series of driving pulses to the first motor and the second motor, respectively, wherein the first series of pulses have phases opposite to the second series of pulses.

* * * * *